(12) United States Patent
Bouldin et al.

(10) Patent No.: US 11,002,093 B2
(45) Date of Patent: May 11, 2021

(54) SEMI-AUTONOMOUS DOWNHOLE TAXI WITH FIBER OPTIC COMMUNICATION

(71) Applicant: Saudi Arabian Oil Company, Dhahran (SA)

(72) Inventors: Brett W. Bouldin, Dhahran (SA); Robert John Turner, Dhahran (SA); Ahmed Y. Bukhamseen, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 75 days.

(21) Appl. No.: 16/266,352

(22) Filed: Feb. 4, 2019

(65) Prior Publication Data
US 2020/0248517 A1 Aug. 6, 2020

(51) Int. Cl.
*E21B 23/00* (2006.01)
*E21B 23/14* (2006.01)
(Continued)

(52) U.S. Cl.
CPC ............ *E21B 23/14* (2013.01); *E21B 17/028* (2013.01); *E21B 41/0085* (2013.01);
(Continued)

(58) Field of Classification Search
CPC .......... E21B 23/001; E21B 23/14; E21B 4/18; E21B 47/135
See application file for complete search history.

(56) References Cited

U.S. PATENT DOCUMENTS

| 4,907,763 A | 3/1990 | Pinson |
| 5,947,213 A * | 9/1999 | Angle ................... E21B 47/002 175/24 |

(Continued)

FOREIGN PATENT DOCUMENTS

| EP | 2504527 | 10/2012 |
| WO | 2015047399 | 4/2015 |
| WO | 2017009671 | 1/2017 |

OTHER PUBLICATIONS

International Search Report and Written Opinion issued in International Application No. PCT/US2020/015930 dated May 15, 2020, 16 pages.

*Primary Examiner* — Giovanna Wright
(74) *Attorney, Agent, or Firm* — Fish & Richardson P.C.

(57) ABSTRACT

A semi-autonomous downhole taxi with fiber optic communication is described. The taxi includes a housing configured to travel within a horizontal section of a wellbore. A docking station is detachably attached to the housing. The docking station is configured to couple to a wireline to pass the taxi through a vertical section of the wellbore. The docking station is configured to be detached from and re-attached to the housing. A fiber optic cable spool is attached to and carried by the housing. A fiber optic cable is wound on the fiber optic cable spool. The fiber optic cable mechanically connects the docking station and the housing. The fiber optic cable is configured to unspool from the fiber optic cable spool as the housing, detached from the docking station, travels through the horizontal section of the wellbore. The fiber optic cable is configured to pass data between the docking station and the housing. The data is associated with wellbore operations to be performed by the taxi in the horizontal section of the wellbore.

20 Claims, 5 Drawing Sheets

(51) Int. Cl.
    *E21B 47/135*     (2012.01)
    *E21B 17/02*     (2006.01)
    *E21B 41/00*     (2006.01)
    *G02B 6/44*     (2006.01)

(52) U.S. Cl.
    CPC .......... *E21B 47/135* (2020.05); *G02B 6/4457* (2013.01); *E21B 23/001* (2020.05)

(56) References Cited

U.S. PATENT DOCUMENTS

| | | | |
|---|---|---|---|
| 6,273,189 B1 | 8/2001 | Gissler et al. | |
| 6,799,633 B2 | 10/2004 | McGregor | |
| 6,845,819 B2 | 1/2005 | Barrett et al. | |
| 7,063,143 B2 | 6/2006 | Tilton et al. | |
| 2008/0073077 A1 | 3/2008 | Tunc et al. | |
| 2009/0084543 A1* | 4/2009 | Fitzgerald | E21B 47/00 166/250.01 |
| 2013/0025852 A1* | 1/2013 | Edmonstone | E21B 23/10 166/250.01 |
| 2014/0196893 A1* | 7/2014 | Vigneaux | E21B 47/12 166/250.07 |
| 2014/0376332 A1 | 12/2014 | Vigneaux et al. | |
| 2015/0021014 A1* | 1/2015 | Hughes | E21B 43/128 166/250.01 |
| 2015/0315850 A1* | 11/2015 | Hallundb K | E21B 23/14 166/385 |
| 2016/0215578 A1* | 7/2016 | Adnan | E21B 23/14 |
| 2017/0350237 A1* | 12/2017 | Giem | E21B 23/14 |
| 2018/0156009 A1* | 6/2018 | Arsalan | E21B 33/127 |

\* cited by examiner

SEMI-AUTONOMOUS DOWNHOLE TAXI WITH FIBER OPTIC COMMUNICATION

TECHNICAL FIELD

This disclosure relates to wellbore tools and more particularly, with tools disposed within vertical, horizontal or deviated wellbores.

BACKGROUND

Well operations involve conveying tools and sensors to different depths in the wellbore. In non-horizontal wellbores, for example, vertical wellbores, well tools can be conveyed using wireline, slickline or coiled tubing using gravity. In horizontal wellbores or wellbores in which the effect of gravity is insufficient to convey the well tool to certain locations, tractors or taxis can be used to propel the well tool to such locations. In certain instances, the tractor can remain coupled to a wireline that can pull the tractor or the taxi out of the wellbore.

SUMMARY

This disclosure describes technologies relating to semi-autonomous downhole taxi with fiber optic communication.

Certain aspects of the subject matter described here can be implemented as a wellbore taxi configured to travel within a wellbore. The taxi includes a housing configured to travel within a horizontal section of a wellbore. A docking station is detachably attached to the housing. The docking station is configured to couple to a wireline to pass the taxi through a vertical section of the wellbore. The docking station is configured to be detached from and re-attached to the housing. A fiber optic cable spool is attached to and carried by the housing. A fiber optic cable is wound on the fiber optic cable spool. The fiber optic cable mechanically connects the docking station and the housing. The fiber optic cable is configured to unspool from the fiber optic cable spool as the housing, detached from the docking station, travels through the horizontal section of the wellbore. The fiber optic cable is configured to pass data between the docking station and the housing. The data is associated with wellbore operations to be performed by the taxi in the horizontal section of the wellbore.

An aspect combinable with any of the other aspects can include the following features. The taxi includes a computer system positioned within the housing. The computer system is connected to the docking station by the fiber optic cable. The computer system is configured to exchange data with the docking station through the fiber optic cable.

An aspect combinable with any of the other aspects can include the following features. The computer system includes one or more processors, and a computer-readable medium storing instructions executable by the one or more processors to perform operations. The operations include aspect combinable with any of the other aspects can include the following features and transmitting at least a portion of the data to the docking station through the fiber optic cable.

An aspect combinable with any of the other aspects can include the following features. The system includes at least one sensor of the one or more sensors attached to the housing. The at least one sensor is connected to the computer system. The at least one sensor is configured to sense wellbore properties in the horizontal section of the wellbore and transmit the sensed wellbore properties to the computer system.

An aspect combinable with any of the other aspects can include the following features. The operations further include receiving wellbore operation instructions from the docking station through the fiber optic cable and causing the taxi to perform wellbore operations communicated by the wellbore operation instructions.

An aspect combinable with any of the other aspects can include the following features. The system includes a wireless transceiver attached to the housing. The wireless transceiver is connected to the computer system. The operations include transmitting at least another portion of the data wirelessly to the docking station through the wireless transceiver.

An aspect combinable with any of the other aspects can include the following features. The instructions include instructions to cause the taxi to perform wellbore operations stored on the computer-readable medium at a wellbore surface before the taxi was lowered into the wellbore.

An aspect combinable with any of the other aspects can include the following features. The system includes an electro-mechanical coupler or an electro-magnetic inductive coupler configured to detachably attach the docking station and the housing.

An aspect combinable with any of the other aspects can include the following features. The docking stations includes a first portion configured to couple to the wireline and a second portion attached to the housing and to the fiber optic cable spool. The second portion and the housing are configured to connect to each other by the electro-mechanical coupler or the electro-magnetic inductive coupler.

An aspect combinable with any of the other aspects can include the following features. The system includes a battery positioned within the housing. The battery is configured to provide power to the taxi to travel through the horizontal section of the wellbore.

An aspect combinable with any of the other aspects can include the following features. The system includes a traction mechanism attached to the housing. The traction mechanism is configured to move the taxi through the horizontal section of the wellbore. The traction mechanism includes multiple wheels attached to the housing. The multiple wheels are configured to carry the housing in the horizontal section of the wellbore.

Certain aspects of the subject matter described here can be implemented as a wellbore taxi configured to travel within a wellbore. The taxi includes a housing configured to travel within a horizontal section of a wellbore. A battery is carried by the housing. The battery is configured to provide power to the taxi to travel through the horizontal section of the wellbore. A fiber optic cable spool is attached to and carried by the housing. A fiber optic cable is wound on the fiber optic cable spool. The fiber optic cable mechanically connects the housing to a docking station. The fiber optic cable is configured to unspool from the fiber optic cable spool as the housing travels through the horizontal section of the wellbore. The fiber optic cable is configured to pass data between the docking station and the housing. The data is associated with wellbore operations to be performed by the taxi in the horizontal section of the wellbore.

An aspect combinable with any of the other aspects can include the following features. The system includes the docking station detachably attached to the housing. The docking station is configured to couple to a wireline to pass the taxi through a vertical section of the wellbore. The docking station is configured to be detached from and re-attached to the housing.

An aspect combinable with any of the other aspects can include the following features. The system includes a computer system positioned within the housing. The computer system is configured to exchange data through the fiber optic cable.

An aspect combinable with any of the other aspects can include the following features. The computer system includes one or more processors, and a computer-readable medium storing instructions executable by the one or more processors to perform operations. The operations include storing data received from one or more sensors disposed in the horizontal section of the wellbore and transmitting at least a portion of the data through the fiber optic cable.

An aspect combinable with any of the other aspects can include the following features. The system includes at least one sensor of the one or more sensors attached to the housing. The at least one sensor is connected to the computer system. The at least one sensor is configured to sense wellbore properties in the horizontal section of the wellbore and transmit the sensed wellbore properties to the computer system.

An aspect combinable with any of the other aspects can include the following features. The operations include receiving wellbore operation instructions through the fiber optic cable, and causing the taxi to perform wellbore operations communicated by the wellbore operation instructions.

Certain aspects of the subject matter described here can be implemented as a method. A wellbore taxi such as the one described in this disclosure travels through a horizontal section of a wellbore. The taxi detaches the housing from the docking station. The fiber optic cable remains attached to the docking station after the housing detaches from the docking station. The housing, using power provided by the battery, travels through the horizontal section of the wellbore away from the docking station. The fiber optic cable unspools from the fiber optic cable spool as the housing travels away from the docking station. The housing, using the power provided by the battery, performs the wellbore operations in the horizontal section of the wellbore.

An aspect combinable with any of the other aspects can include the following features. The fiber optic cable passes the data between the docking station and the housing.

An aspect combinable with any of the other aspects can include the following features. The housing, using the power provided by the battery, returns to the docking station upon completing the wellbore operations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The disclosure describes a battery-powered semi-autonomous vehicle deployed through a vertical wellbore in a wellbore into a horizontal wellbore in the wellbore. The vehicle can be used to carry items (for example, sensors or tools) to the horizontal wellbore or to perform operations in the wellbore. The vehicle (called a taxi) is semi-autonomous in that it is lowered down the vertical wellbore using an umbilical and then self-propels through the horizontal wellbore under battery power. The taxi travels into the horizontal wellbore where it performs operations. Upon completion, the taxi returns to the umbilical where it is re-captured and raised to the surface. In some implementations, the taxi communicates wirelessly with the surface to receive instructions on operations to perform in the horizontal wellbore. The taxi can carry a memory that stores the operations that the taxi needs to perform in the horizontal wellbore. The taxi can be connected to a docking station by a fiber optic cable through which data is exchanged with the taxi. The taxi can be run into and retrieved from the wellbore with an electric wireline, mono-conductor cable, slickline, a hepta-cable or a high tension fiber optic cable. The docking station can allow the taxi to detach from or reconnect to the wireline while the fiber optic cable enables data exchange. Once the taxi has completed its operations and returns to the docking station, additional data exchange with the surface of the wellbore is enabled.

Implementing the semi-autonomous taxi described here can reduce the resources needed to move the taxi through the horizontal section of the wellbore. For example, providing power through a wireline run in from the surface can require resources to tow the wireline in the horizontal section of the wellbore. The semi-autonomous nature of the taxi disclosed here eliminates the need for the wireline in the horizontal section, and consequently reduces the resources needed to implement the wireline in the wellbore. The semi-autonomous taxi described here can have additional operational capacity compared to a fully autonomous taxi or tractor, that is, one that can be powered entirely without a wireline. For example, a fully autonomous taxi that operates entirely on battery power can have less available operating power compared to the semi-autonomous taxi that operates in-part using power from a wireline and in-part using battery power. Moreover, where a re-chargeable battery is used, power to re-charge the battery can be transmitted via the wireline. Such an option may be unavailable for a fully autonomous taxi.

Figure 1A:
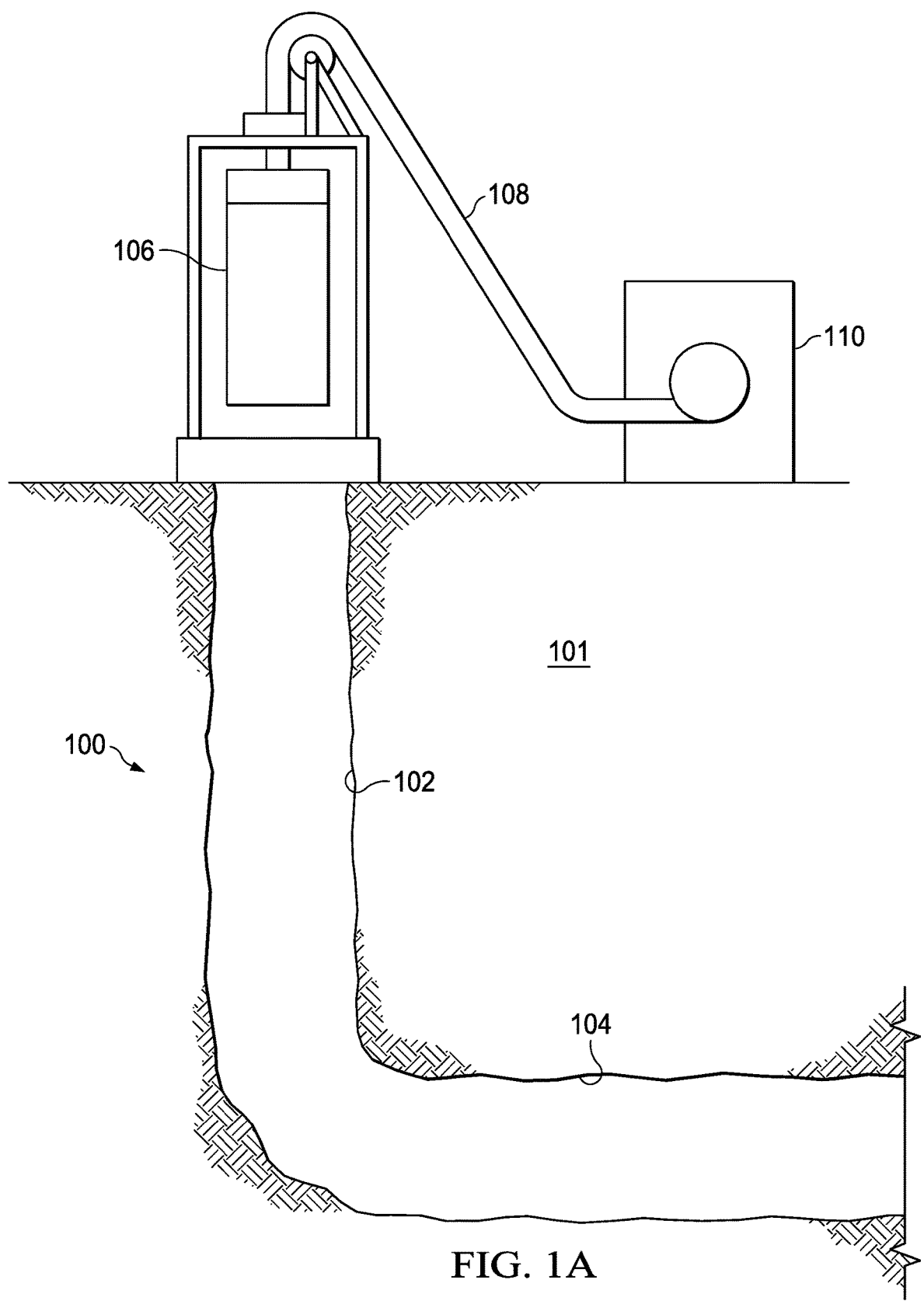
FIGS. 1A-1D are schematic diagrams showing different stages of deployment of a semi-autonomous wellbore taxi.

FIGS. 1A-1D are schematic diagrams showing different stages of deployment of a semi-autonomous wellbore taxi. FIG. 1A is a schematic diagram showing the taxi 106 prior to deployment into a wellbore 100. The wellbore 100 includes a vertical section 102 and a horizontal section 104. The wellbore 100 is formed in a subterranean zone 101, for example, a portion of the subterranean zone 101 in which hydrocarbons are entrapped. The taxi 106 can be deployed in the wellbore 100 to perform well operations, for example, well completion or other operations. In some implementations, the taxi 106 can be lowered into the wellbore 100 using an umbilical 108, for example, an electric line, a mono-conductor cable or a fiber optic cable, that is spooled, for example, on a wireline truck 110. The umbilical 108 using which the taxi 106 is deployed into the wellbore 100 can have sufficient mechanical strength to lower and raise the taxi 106 through the vertical section 102 of the wellbore 100. In addition, the umbilical 108 can transmit power from a surface of the wellbore 100 to the taxi 106. In some implementations, the taxi 106 can be lowered using a stuffing box and a lubricator connected to a wellhead at an entrance of the wellbore 100.

Figure 1B:
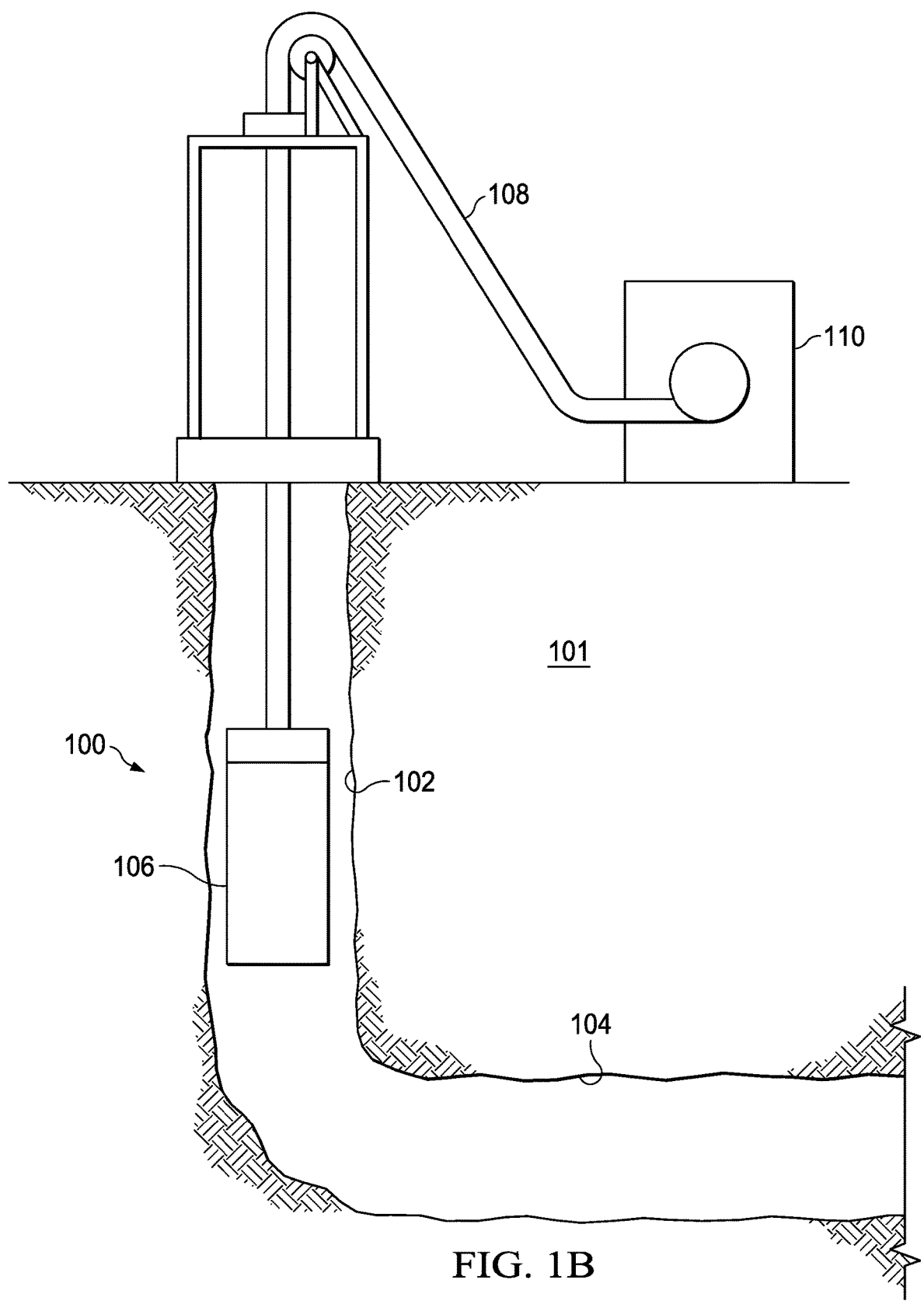

FIG. 1B is a schematic diagram showing the taxi 106 being deployed into the vertical section 102 of the wellbore 100. In some implementations, the taxi 106 can be lowered into the vertical section 102 of the wellbore 100 under gravity. For example, as the umbilical 108 is unspooled from the wireline truck 110, gravity causes the taxi 106 to be lowered into the wellbore 100. During this stage of deployment, no power or other data signals may be transmitted to the taxi 106 via the umbilical 108. Instead, the umbilical 108 can serve solely to mechanically lower the taxi 106 to the horizontal section 104.

Figure 1C:
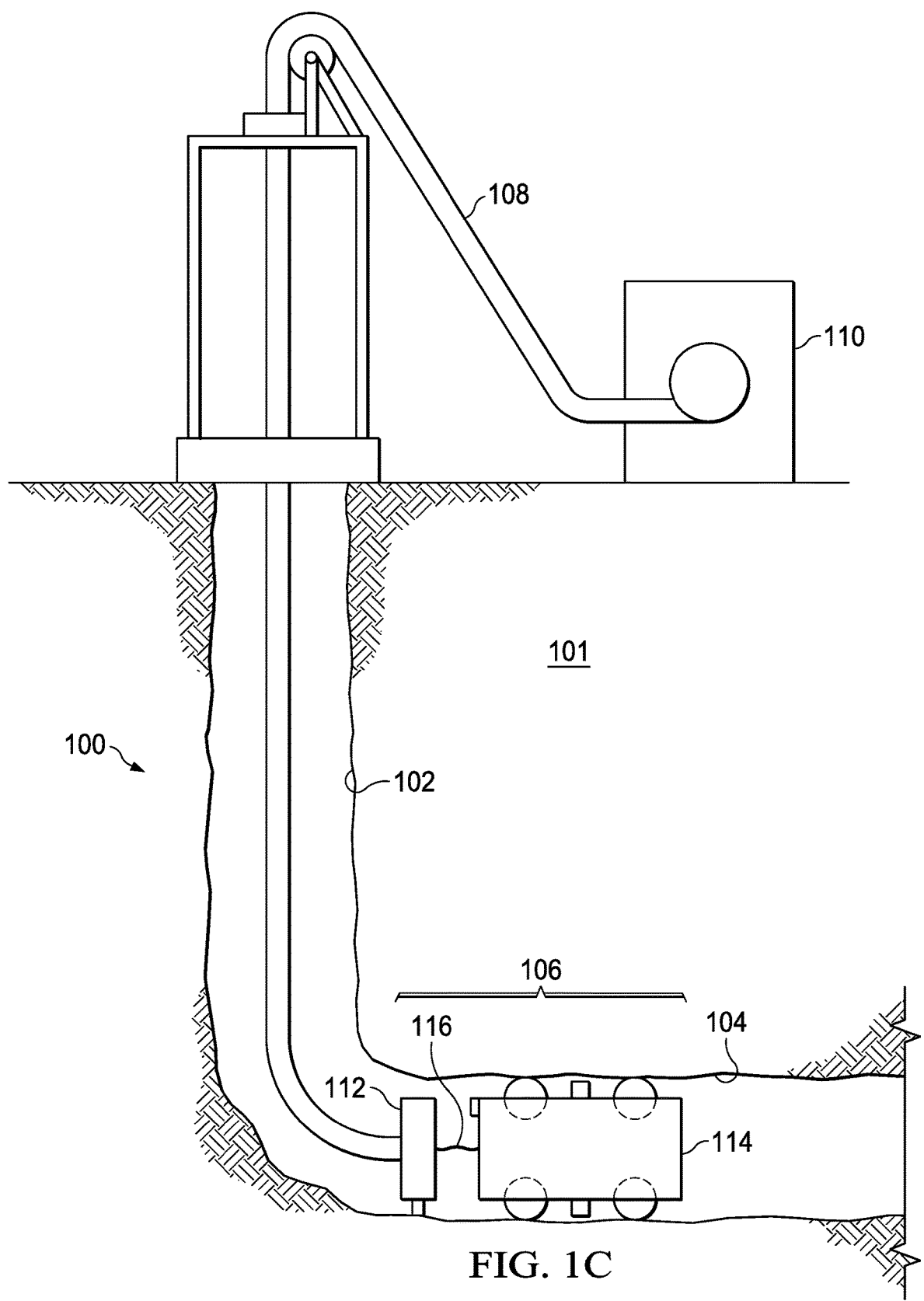

FIG. 1C is a schematic diagram showing the taxi 106 at the beginning of the horizontal section 104 of the wellbore 100. Once the taxi 106 reaches the beginning of the horizontal section 104, the taxi 106 will contact the inner wall of the wellbore 100. At this point, gravity will no longer carry the taxi 106 further into the wellbore 100. Accelerometers on the taxi 106 no longer provide an audible output or the taxi 106 no longer takes additional umbilical 108 from the wireline truck 110. At this point, the umbilical-assisted deployment of the taxi 106 is complete. Subsequent deployment uses battery power, as described later. The combination of the umbilical-assisted deployment in the vertical section 102 of the wellbore 100 and the battery-assisted deployment in the horizontal section 104 of the wellbore 104 characterizes the semi-autonomous nature of the taxi 106.

Figure 1D:
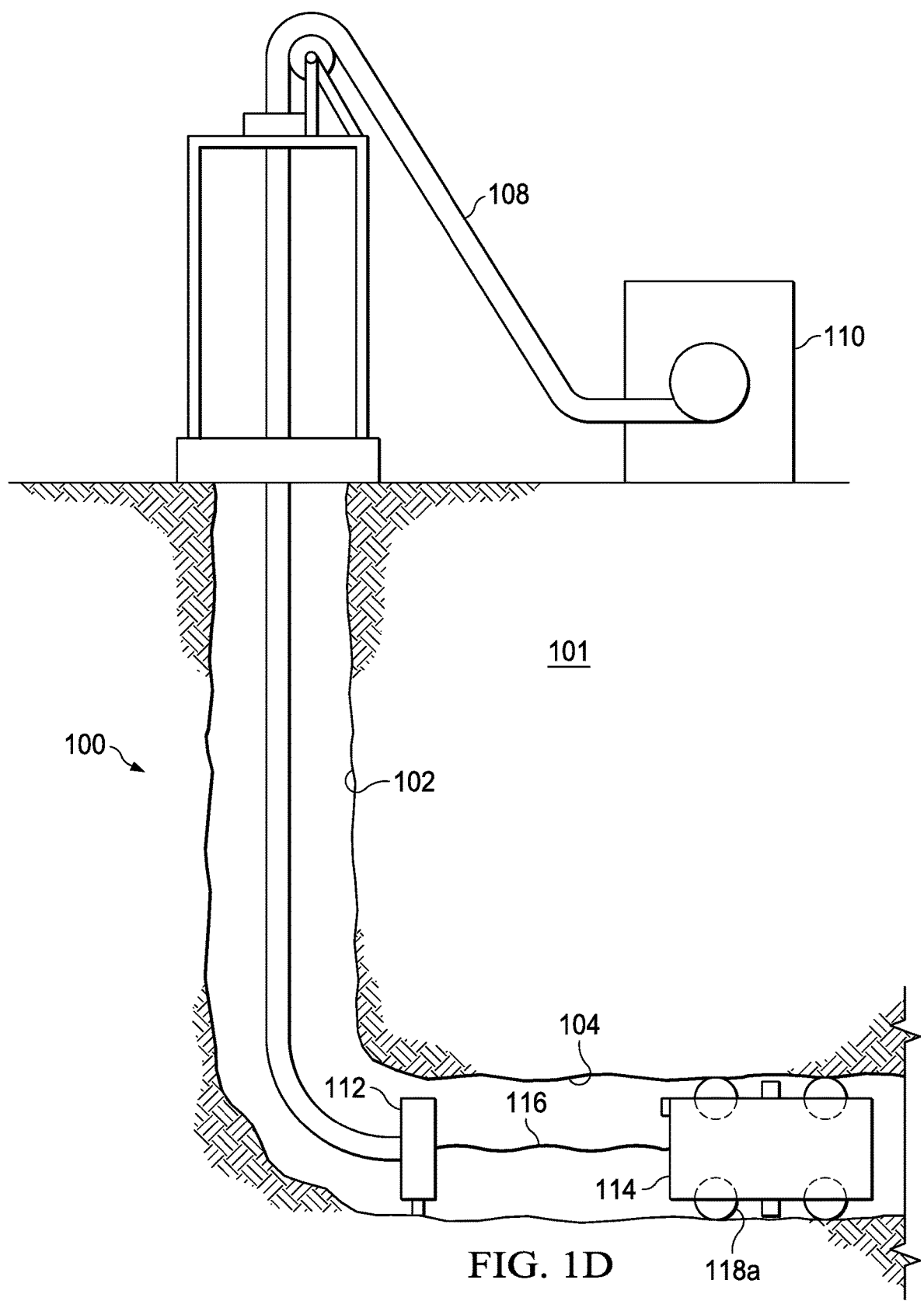
Figure 2:
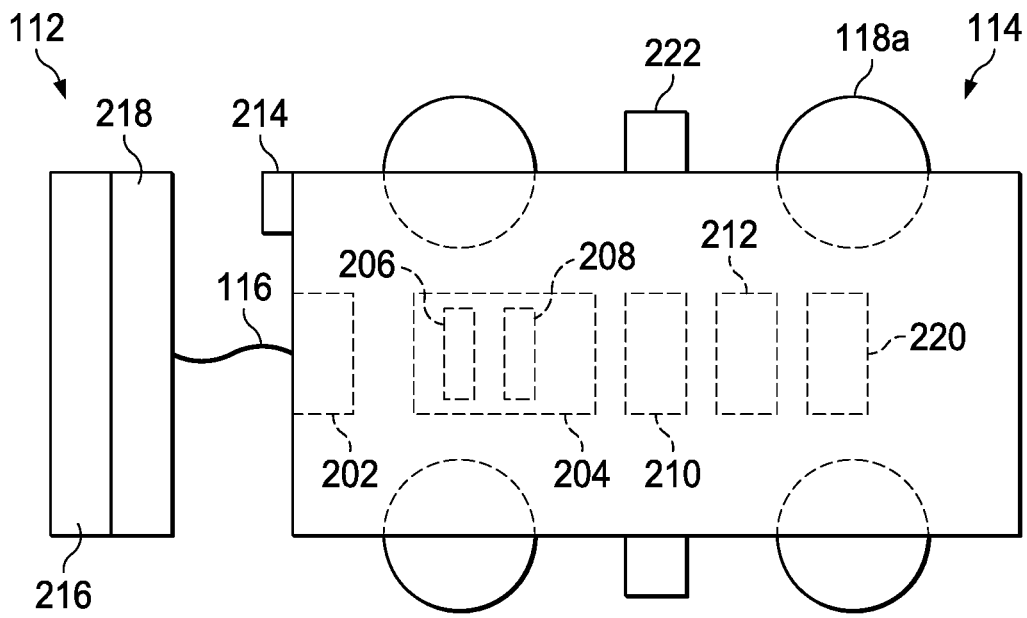
FIG. 2 is a schematic diagram of the semi-autonomous wellbore taxi.

FIG. 1D is a schematic diagram showing the taxi 106 being deployed into the horizontal section 104 of the wellbore 100. Prior to describing the deployment into the horizontal section 104, features of the taxi 106 are described with reference to the schematic diagram shown in FIG. 2. All components of the taxi 106 are made from material that can be implemented under wellbore downhole conditions, that is, at high temperatures and pressures and in the presence of corrosive elements typically found in subterranean zones. The taxi 106 includes a housing 114 configured to travel within the horizontal section 104 of the wellbore 10. The taxi 106 includes a docking station 112 detachably attached to the housing 114. By detachably attached, it is meant that the housing 114 and the docking station 112 can be attached in certain instances and detached in others, and that the two can be re-attached following detachment. Each of the housing 114 and the docking station 112 can be configured to perform certain functions when attached or detached. That is, detaching the housing 114 and the docking station 112 does not render them unable to perform their respective functions.

The docking station 114 is configured to couple to a wireline, for example, the umbilical 108, to pass the taxi through the vertical section 102 of the wellbore 100. In some implementations, the docking station 112 can have two portions. A first portion 216 can be coupled to the umbilical 108 while the second portion 218 can be attached to the housing 114. In some implementations, the first portion 216 and the second portion 218 can be separable portions. In some implementations, the two portions can be integrally connected. The second portion 218 can be attached to the housing by a coupling mechanism 214, for example, an electro-mechanical coupler or an electro-magnetic inductive coupler. Alternatively, or in addition, the coupling mechanism 214 can include a piezo acoustic electric connector or a mechanical snap connection.

The taxi 106 includes a fiber optic cable spool 202 attached to and carried by the housing 114. Fiber optic cable 116 is wound on the fiber optic cable spool 202 and mechanically connects the docking station 112 and the housing 114. The fiber optic cable 116 unspools from the fiber optic cable spool 202 as the housing 114, detached from the docking station 112, travels through the horizontal section 104 of the wellbore 100, as described later. The fiber optic cable 116 is configured to pass data between the docking station 112 and the housing 114. The data is associated with wellbore operations to be performed by the taxi 106 in the horizontal section 104 of the wellbore 100. In some implementations, the data can include diagnostic data about the taxi 106 or monitoring data that communicates status of the wellbore operations. As an alternative to fiber optic cables, a thin wire through which data can be transmitted can be used. A quantity of resources to carry such a wire on a wire spool and to tow the wire as the taxi moves in the horizontal section 104 of the wellbore 100 can be significantly small compared to carrying or towing the umbilical.

Returning to FIG. 1D, when the taxi 106 reaches the end of the vertical section 102 and the beginning of the horizontal section 104 of the wellbore 100, the docking station 112 can be detached from the housing 114. To do so, the electro-mechanical coupler or the electro-magnetic inductive coupler can be activated, as described earlier, to detach the housing 114 from the docking station 112. Subsequently, the docking station 112 remains at its location until the housing 114 returns, as described later.

In some implementations, the taxi 106 includes a traction mechanism attached to the housing 114. The traction mechanism is configured to move the taxi 102 (that is, the housing 112 and attached components that have been detached from the docking station 116) through the horizontal section 104 of the wellbore 100. In some implementations, the traction mechanism includes multiple (for example, at least two) wheels (for example, wheel 118a) attached to the housing 114 that can rest on the inner wall of the wellbore 100 and rotate to carry the housing 114 in the horizontal section 104 of the wellbore 100. The traction mechanism includes one or more electric motors that can impart rotation to the multiple wheels. The traction mechanism alternatively or additionally includes two grippers (for example, gripper 222) to increase the traction. The traction mechanism can further include an axial piston that can provide an axial force to increase the grip of the housing 114 to the inner wall of the wellbore 100.

As the housing 114 moves through the horizontal section 104 of the wellbore 100 away from the stationary docking station 112, the fiber optic cable spool 202, which is carried by the housing 114, unspools the fiber optic cable 116. In this manner, the fiber optic cable 116 maintains a connection between the docking station 112 and the housing 116 after the two have been detached. Carrying the fiber optic cable spool 202 on the housing 114 eases a load (that is, tension) on the fiber optic cable as it is unspooled from the spool 202.

In some implementations, the taxi 106 can include a computer system 204 positioned within or outside, or otherwise carried by the housing 114. The computer system 204 can be connected to the docking station 112 by the fiber optic cable 116 to exchange data with the docking station 112 through the fiber optic cable 116. For example, one end of the fiber optic cable 116 spooled on the fiber optic cable spool 202 can be connected to an interface attached to the docking station 112. The other end of the fiber optic cable 116 can be connected to an interface of the computer system 204. The computer system 204 can pass to and receive from the docking station 112 data (for example, recorded information, wellbore operation instructions or similar data) through the fiber optic cable 116.

The computer system 204 includes one or more processors 206 and a computer-readable medium 208 (for example, non-transitory computer-readable medium) storing instructions executable by the one or more processors 206 to perform operations. The operations include, for example, storing data received from one or more sensors disposed in the horizontal section 104 of the wellbore 100. For example, the sensors can have been disposed in the horizontal section 104 when the wellbore 100 was formed. The sensors can transmit sensed data to the computer system 204 when the taxi 106 approaches the vicinity of the sensors. In some implementations, at least one sensor 210 can be attached to (that is, carried by) the housing 114. Examples of the sensor 210 include gyroscopes, magnetometers, accelerometers, pressure sensors, temperature sensors, cameras, other sensors or any combination of them. The sensor 210 can be connected to the computer system 204. The sensor 210 can sense wellbore properties in the horizontal section 104 (for example, temperature, pressure, electromagnetic signals or other wellbore properties) in the horizontal section 104 of the wellbore 100, and transmit the sensed wellbore properties to the computer system 204. The computer system 204 can transmit all or at least a portion of the data received from the various sensors to the docking station 112 through the fiber optic cable 116.

In some implementations, the docking station 112 can receive instructions from the surface of the wellbore 100 via the umbilical 108. The docking station 112 can transmit the instructions to the housing 116 via the fiber optic cable 116. The instructions can include wellbore operation instructions. For example, the instructions can activate the sensor 210 to perform certain operations, instruct the computer system 204 to record certain data or transmit stored data, instruct the taxi 106 to move by a certain distance away from or toward the docking station 112. Examples of operations can also include logging or shifting valves in the wellbore 100. Upon receiving the instructions, the computer system 204 executes the instructions, for example, by causing the taxi 104 to perform the operations communicated by the instructions.

In some implementations, the housing 114 can include a wireless transceiver 212 that is operatively coupled to the computer system 204. The computer system 204 can execute operations to cause the wireless transceiver 212 to wirelessly transmit instructions or data (or both) from the housing 114 to the docking station 112. The docking station 112 can include a wireless transceiver (not shown) to receive the wireless signals from the transceiver 212. In this manner, data exchange between the docking station 112 and the housing 114 can occur via the fiber optic cable 116 or wirelessly via the transceiver 212 or both.

In some implementations, instructions to cause the taxi 106 to perform certain wellbore operations can be stored on the computer-readable medium 208 at a wellbore surface before the taxi 106 is lowered into the wellbore. Upon reaching the horizontal section 104 of the wellbore, the computer system 204 can execute the instructions thereby causing the taxi 106 to perform the operations without any input either via the fiber optic cable 116 or wirelessly via the transceiver 212. In some implementations, the instructions can cause the housing 114 to return to the docking station 112 upon determining that the fiber optic cable 116 has been severed or that the fiber optic connection between the docking station 112 and the housing 114 has otherwise been broken. For example, the computer system 204 can determine that the connection has been severed in response to not receiving data or instructions via the fiber optic cable 116 for a threshold duration.

The housing 114 can include a battery 220 positioned within or otherwise carried by the housing 114. The battery 220 can provide power to perform all of the operations described earlier. For example, the battery 220 can provide power to the traction mechanism to cause the taxi 106 to move towards or away from the docking station 112 in the horizontal section 104 of the wellbore 100. The battery 220 can provide power to cause the computer system 204 to perform operations described earlier. The battery 220 can provide power to the sensor 210 (or other sensors or tools) carried by the housing 114 to perform appropriate operations. For example, the battery 220 can be a lithium-ion battery, a flywheel, a fuel cell or any other power source that can move a tool using self-contained power.

Upon completing operations within the horizontal section 104, the housing 114 can return to the docking station 112 for retrieval to the surface. For example, instructions to return to the docking station 112 can be transmitted to the housing 114 via the fiber optic cable 116. In addition, instructions can be transmitted wirelessly via the transceiver 212. In some implementations, wellbore operations can be stored on the computer-readable medium 208. Upon determining that the wellbore operations have been performed, the computer system 204 can instruct the traction mechanism to return the housing 114 to the docking station 112. The electro-mechanical coupler or the electro-magnetic inductive coupler can be activated to re-attach the housing 114 to the docking station 112. Subsequently, the umbilical 108 can be activated to raise the taxi 106, which includes the docking station 112 and the housing 114, back to the surface. The fiber optic cable 116 may not be spooled back onto the fiber optic cable spool 202 during the retraction (or at any other time). In some instances, the fiber optic cable 116 may break during the retraction or be left behind in the wellbore 100 after retraction. In some implementations, the fiber optic cable spool 202 can be operated, for example, using power from the battery 220 to re-spool the fiber optic cable 202 as the housing 116 retracts toward the docking station 112.

Figure 3:
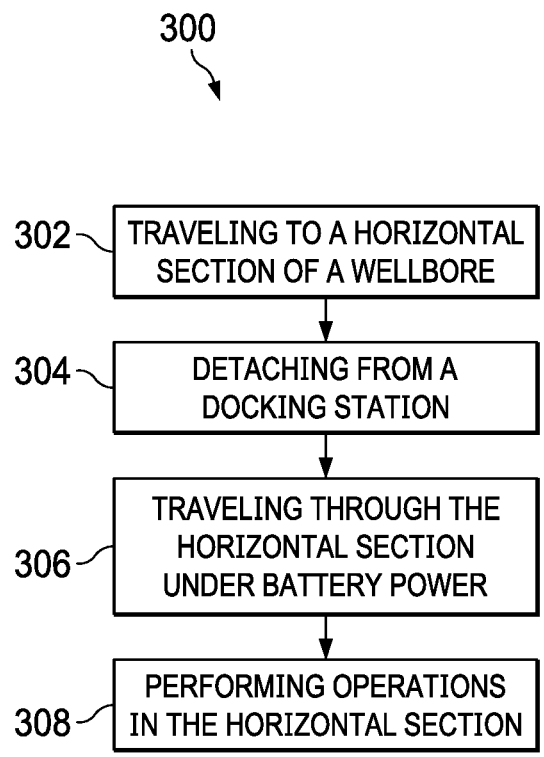
FIG. 3 is a flowchart of an example of a process implemented by the semi-autonomous wellbore taxi.

FIG. 3 is a flowchart of an example of a process 300 implemented by the semi-autonomous wellbore taxi. At 302, the taxi travels to the horizontal section 104 of the wellbore 100 by being lowered using the umbilical 108. At 304, the taxi detaches from the docking station. At 306, the taxi travels through the horizontal section 104 of the wellbore 100 under battery power. At 308, the taxi performs operations in the horizontal section 104. Subsequently, the taxi returns and attaches to the docking station under battery power. Then, the taxi is raised to the surface using the umbilical 108.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A wellbore taxi configured to travel within a wellbore, the taxi comprising:
   a housing configured to travel within a horizontal section of a wellbore;
   a docking station detachably attached to the housing, the docking station configured to couple to a wireline to pass the taxi through a vertical section of the wellbore, the docking station configured to be detached from and re-attached to the housing and to transmit data to and receive data from the housing;

a fiber optic cable spool attached to and carried by the housing;

a fiber optic cable wound on the fiber optic cable spool, the fiber optic cable mechanically connecting and thereby forming a fiber optic connection between the docking station and the housing, the fiber optic cable configured to unspool from the fiber optic cable spool as the housing, detached from the docking station, travels through the horizontal section of the wellbore, the fiber optic cable configured to pass data between the docking station and the housing, the data associated with wellbore operations to be performed by the housing in the horizontal section of the wellbore; and a computer system positioned within the housing, the computer system connected to the docking station by the fiber optic cable, the computer system comprising:
one or more processors; and
a computer-readable medium storing instructions executable by the one or more processors to perform operations comprising:
exchanging data with the docking station through the fiber optic cable;
determining whether the fiber optic connection between the docking station and the housing has broken; and
causing the housing to return to the docking station in response to a determination by the computer system that the fiber optic connection between the docking station and the housing has broken.

2. The taxi of claim 1, wherein the operations further comprise:
storing data received from one or more sensors disposed in the horizontal section of the wellbore; and
transmitting at least a portion of the data to the docking station through the fiber optic cable.

3. The taxi of claim 2, further comprising at least one sensor of the one or more sensors attached to the housing, the at least one sensor connected to the computer system, the at least one sensor configured to:
sense wellbore properties in the horizontal section of the wellbore; and
transmit the sensed wellbore properties to the computer system.

4. The taxi of claim 1, wherein the operations further comprise:
receiving wellbore operation instructions from the docking station through the fiber optic cable; and
causing the housing to perform wellbore operations communicated by the wellbore operation instructions.

5. The taxi of claim 1, further comprising a wireless transceiver attached to the housing, the wireless transceiver connected to the computer system, wherein the operations further comprise transmitting at least another portion of the data wirelessly to the docking station through the wireless transceiver.

6. The taxi of claim 1, wherein the instructions comprise instructions to cause the housing to perform wellbore operations stored on the computer-readable medium at a wellbore surface before the taxi was lowered into the wellbore.

7. The taxi of claim 1, further comprising an electro-mechanical coupler or an electro-magnetic inductive coupler configured to detachably attach the docking station and the housing.

8. The taxi of claim 7, wherein the docking station comprises:
a first portion configured to couple to the wireline; and
a second portion attached to the housing and to the fiber optic cable spool, the second portion and the housing configured to connect to each other by the electro-mechanical coupler or the electro-magnetic inductive coupler.

9. The taxi of claim 1, further comprising a battery positioned within the housing, the battery configured to provide power to the housing to travel through the horizontal section of the wellbore.

10. The taxi of claim 1, further comprising a traction mechanism attached to the housing, the traction mechanism configured to move the housing through the horizontal section of the wellbore, the traction mechanism comprising a plurality of wheels attached to the housing, the plurality of wheels configured to carry the housing in the horizontal section of the wellbore.

11. The taxi of claim 1, wherein the determining is based on a duration of not receiving data or instructions via the fiber optic cable meeting a threshold duration.

12. A wellbore taxi configured to travel within a wellbore, the taxi comprising:
a housing configured to travel within a horizontal section of a wellbore;
a battery carried by the housing, the battery configured to provide power to the taxi to travel through the horizontal section of the wellbore;
a fiber optic cable spool attached to and carried by the housing;
a fiber optic cable wound on the fiber optic cable spool, the fiber optic cable mechanically connecting the housing to a docking station and thereby forming a fiber optic connection between the docking station and the housing, the docking station configured to transmit data to and receive data from the housing, the fiber optic cable configured to unspool from the fiber optic cable spool as the housing travels through the horizontal section of the wellbore, the fiber optic cable configured to pass data between the docking station and the housing, the data associated with wellbore operations to be performed by the housing in the horizontal section of the wellbore; and
a computer system positioned within the housing, the computer system comprising:
one or more processors; and
a computer-readable medium storing instructions executable by the one or more processors to perform operations comprising:
exchanging data with the docking station through the fiber optic cable;
determining whether the fiber optic connection between the docking station and the housing has broken; and
causing the housing to return to the docking station in response to a determination by the computer system that the fiber optic connection between the docking station and the housing has broken.

13. The taxi of claim 12, further comprising the docking station detachably attached to the housing, the docking station configured to couple to a wireline to pass the taxi through a vertical section of the wellbore, the docking station configured to be detached from and re-attached to the housing.

14. The taxi of claim 12, wherein the operations further comprise:
storing data received from one or more sensors disposed in the horizontal section of the wellbore; and transmitting at least a portion of the data through the fiber optic cable.

15. The taxi of claim 14, further comprising at least one sensor of the one or more sensors attached to the housing, the at least one sensor connected to the computer system, the at least one sensor configured to:
   sense wellbore properties in the horizontal section of the wellbore; and
   transmit the sensed wellbore properties to the computer system.

16. The taxi of claim 12, wherein the operations further comprise:
   receiving wellbore operation instructions through the fiber optic cable; and
   causing the housing to perform wellbore operations communicated by the wellbore operation instructions.

17. A method comprising:
   traveling, by a wellbore taxi, to a horizontal section of a wellbore, the taxi comprising:
      a housing configured to travel within a horizontal section of a wellbore;
      a battery carried by the housing, the battery configured to provide power to the taxi to travel through the horizontal section of the wellbore;
      a fiber optic cable spool attached to and carried by the housing;
      a fiber optic cable wound on the fiber optic cable spool, the fiber optic cable mechanically connecting the housing to a docking station and thereby forming a fiber optic connection between the docking station and the housing, the docking station configured to transmit data to and receive data from the housing, the fiber optic cable configured to unspool from the fiber optic cable spool as the housing travels through the horizontal section of the wellbore, the fiber optic cable configured to pass data between the docking station and the housing, the data associated with wellbore operations to be performed by the housing in the horizontal section of the wellbore; and
      a computer system positioned within the housing;
   detaching, by the taxi, the housing from the docking station, wherein the fiber optic cable remains attached to the docking station after the housing detaches from the docking station;
   traveling, by the housing and using the power provided by the battery, through the horizontal section of the wellbore away from the docking station, wherein the fiber optic cable unspools from the fiber optic cable spool as the housing travels away from the docking station; and
   performing, by the housing and using the power provided by the battery, the wellbore operations in the horizontal section of the wellbore;
   determining, by the computer system, whether the fiber optic connection between the docking station and the housing has broken;
   causing, by the computer system, the housing to return to the docking station in response to a determination by the computer system that the fiber optic connection between the docking station and the housing has broken.

18. The method of claim 17, further comprising passing, by the fiber optic cable, the data between the docking station and the housing.

19. The method of claim 17, further comprising returning, by the housing and using the power provided by the battery, to the docking station upon completing the wellbore operations.

20. The method of claim 17, wherein the determining is based on a duration of not receiving data or instructions via the fiber optic cable meeting a threshold duration.

* * * * *